(12) United States Patent
Yamauchi et al.

(10) Patent No.: US 9,927,689 B2
(45) Date of Patent: Mar. 27, 2018

(54) ILLUMINATION DEVICE

(71) Applicant: PANASONIC INTELLECTUAL PROPERTY MANAGEMENT CO., LTD., Osaka (JP)

(72) Inventors: Kentaro Yamauchi, Osaka (JP); Atsushi Motoya, Shiga (JP); Ryo Kawamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 14/526,912

(22) Filed: Oct. 29, 2014

(65) Prior Publication Data
US 2015/0124223 A1 May 7, 2015

(30) Foreign Application Priority Data

Nov. 5, 2013 (JP) ................................. 2013-229825

(51) Int. Cl.
*G03B 21/20* (2006.01)
*G03B 21/00* (2006.01)
*G03B 21/26* (2006.01)

(52) U.S. Cl.
CPC ....... *G03B 21/2093* (2013.01); *G03B 21/006* (2013.01); *G03B 21/008* (2013.01); *G03B 21/26* (2013.01); *G03B 21/2073* (2013.01)

(58) Field of Classification Search
CPC .... H04N 9/3194; H04N 9/3176; H04N 9/315; H04N 9/3155; H04N 9/3164; G03B 21/208; G03B 21/2013; G03B 21/2053; G03B 21/206; G03B 21/26; G03B 21/13; G03B 21/2093; G03B 21/2066; G02B 6/0078; F21K 9/232; F21S 48/1388; F21V 7/0016
USPC .................................... 353/29, 82; 362/277
See application file for complete search history.

(56) References Cited

U.S. PATENT DOCUMENTS

| 2005/0201118 | A1* | 9/2005 | Godo | ......................... F21V 5/04 362/555 |
| 2006/0126028 | A1* | 6/2006 | Ullman | ................... G03B 21/28 353/69 |
| 2010/0208211 | A1* | 8/2010 | Paulussen | ............... G03B 21/13 353/29 |
| 2011/0175934 | A1* | 7/2011 | Paulussen | ............ G03B 21/005 345/690 |
| 2012/0013238 | A1* | 1/2012 | Jonsson | .................... F21V 5/04 313/110 |
| 2013/0002687 | A1* | 1/2013 | Conti | ...................... F21K 9/135 345/501 |

(Continued)

FOREIGN PATENT DOCUMENTS

JP    2009-199854    9/2009

*Primary Examiner* — Christina Riddle
*Assistant Examiner* — Christopher Lamb, II
(74) *Attorney, Agent, or Firm* — Greenblum & Bernstein, P.L.C.

(57) ABSTRACT

An illumination device includes an image element configured to convert light incident thereon to image light and to output the image light, a first light path extending to pass through the image element, and a second light path extending without passing through the image element. The first light path and the second light path are configured to project lights passing therethrough, respectively, on an object existing outside the illumination device.

19 Claims, 12 Drawing Sheets

(56) References Cited

U.S. PATENT DOCUMENTS

| | | | |
|---|---|---|---|
| 2013/0249959 A1* | 9/2013 | Umehara | H04N 7/142 345/690 |
| 2014/0043544 A1* | 2/2014 | Kasuga | F21V 33/0052 348/744 |
| 2014/0098303 A1* | 4/2014 | Kasuga | F21K 9/135 349/5 |
| 2014/0139812 A1* | 5/2014 | Nagatani | H04N 9/3144 353/52 |
| 2014/0198949 A1* | 7/2014 | Garlington | G03B 21/10 382/103 |

* cited by examiner

ILLUMINATION DEVICE

CROSS-REFERENCE TO RELATED APPLICATION

This application claims priority to Japanese Patent Application No. 2013-229825 filed on November 5, the entire contents of which are incorporated herein by reference.

TECHNICAL FIELD

The present disclosure relates to an illumination device and, more particularly, to an illumination device capable of irradiating light for illumination and light for image.

BACKGROUND ART

A projector as an image display device that enlarges and projects various images onto a screen becomes widespread (see, e.g., Japanese Unexamined Patent Application Publication No 2009-199854). More specifically, there are known a projector of the type that projects an image by allowing the light emitted from a light source to transmit through a transmission type image element and a projector of the type that projects an image by allowing the light emitted from a light source to be reflected by a reflection type image element.

If an illumination device is capable of emitting not only light for illumination but also light for image, the illumination device can be used in a wide variety of applications.

SUMMARY OF THE INVENTION

In view of the above, the present disclosure provides an illumination device capable of simultaneously emitting light for illumination and light for image.

In accordance with an aspect of the present invention, there is provided an illumination device, including: an image element configured to convert light incident thereon to image light and to output the image light; a first light path extending to pass through the image element; and a second light path extending without passing through the image element, wherein the first light path and the second light path are configured to project lights passing therethrough, respectively, on an object existing outside the illumination device.

The illumination device may further include a projection lens configured to project the lights passing through the first light path and the second light path, respectively, on the object, wherein the first light path includes a light path extending toward the projection lens via the image element, the second light path includes a light path extending toward the projection lens without passing through the image element, and the first light path and the second light path are two split light paths, extending directions of which are substantially identical with each other.

The image element may be a substantially planar element, and the first light path and the second light path may respectively extend through two separate regions on a plane including the image element.

When viewed in the extending direction of the first light path, the first light path may be surrounded by the second light path in at least a portion thereof along the extending direction.

The illumination device may further include a light shielding member configured to isolate at least a portion of the first light path from the second light path.

At least a portion of the first light path may be provided adjacent to the second light path without being isolated from the second light path.

The image element may include a light-transmission-type image element configured to convert the light transmitting therethrough to the image light.

The first light path and the second light path may be two light paths split on a plane including two separate regions one of which is an image forming region where the image element is provided and the other of which is a light transmitting region, the first light path is for light passing through the image forming region to be incident on the projection lens, and the second light path is for light passing through the light transmitting region to be incident on the projection lens.

The illumination device may further include a substrate, and wherein the image forming region and the light transmitting region are provided in the substrate.

An opening may be formed in the light transmitting region.

The image element may include a transmission-type liquid crystal panel.

The illumination device may further include a polarizing element that includes a light transmitting region and a polarization control region where a polarization control element for polarizing light moving toward the image element or light emitted from the image element is provided.

The polarizing element may further include a substrate in which the polarization control region and the light transmitting region are provided.

The image element may include a light-reflection-type image element configured to reflect the light incident on the image element as the image light.

The first light path and the second light path may be two light paths split on a plane including two separate regions one of which is an image forming region where the image element is provided and the other of which is a light reflecting region, the first light path is for light that is reflected in the image forming region to be incident on the projection lens, and the second light path is for light that is reflected in the light reflecting region to be incident on the projection lens.

The illumination device may further include a substrate, and wherein the image forming region and the light reflecting region are provided in the substrate.

The image element may include a reflection-type liquid crystal panel.

The image element may be a micro mirror array.

The illumination device according to the present invention can simultaneously emit light for illumination but also light for image.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1A:
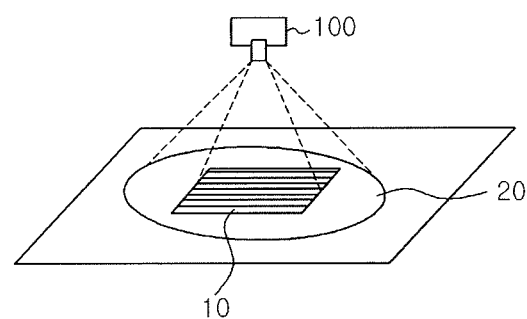
FIGS. 1A and 1B are views for explaining the use of an illumination device according to an embodiment.

Hereinafter, embodiments of an illumination device (or lighting projector) will be described in detail with reference to the accompanying drawings. Each of the embodiments described below shows one preferred specific example of the present invention. Accordingly, the numerical values, the shapes, the materials, the components, the arrangement positions of the components and the connection form of the components set forth in the following embodiments are nothing more than one example and are not intended to limit the present invention. Among the components of the following embodiments, the components not recited in an independent claim that defines a top concept of the present invention will be described as arbitrary components.

The drawings are schematic views and are not strictly depicting the present invention. In the drawings, like reference numerals will be used for like or corresponding parts and will not be repeatedly described or will be described in a simplified manner.

First Embodiment

Figure 1B:
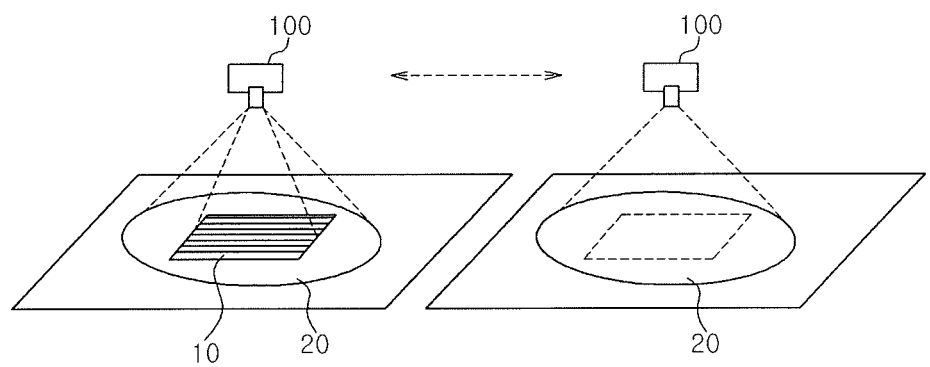

First, description will be made on the use of an illumination device according to a first embodiment. FIGS. 1A and 1B are views for explaining the use of the illumination device according to the first embodiment.

As shown in FIG. 1A, the illumination device 100 according to the first embodiment can simultaneously irradiate image light 10 (light for image) and an illumination light 20 (light for illumination). For example, the illumination device 100 can irradiate the image light 10 onto a surface (irradiation surface) of a structure and can illuminate the surroundings of the image light 10 with the illumination light 20.

More specifically, for example, if the illumination device 100 is installed above a desk, the illumination device 100 can illuminate the desk and display an image on the desk. Furthermore, as shown in FIG. 1B, the illumination device 100 can also turn on and off only the irradiation of the image light 10.

As set forth above, the illumination device 100 has not only an illumination function but also a function of presenting an image to a user.

Figure 2:
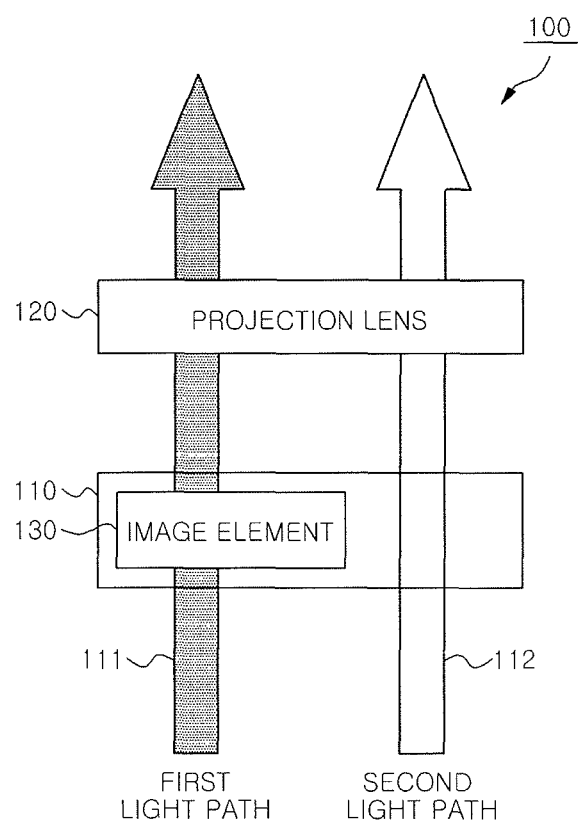
FIG. 2 is a view conceptually showing the configuration of the illumination device according to the embodiment.
Figure 3:
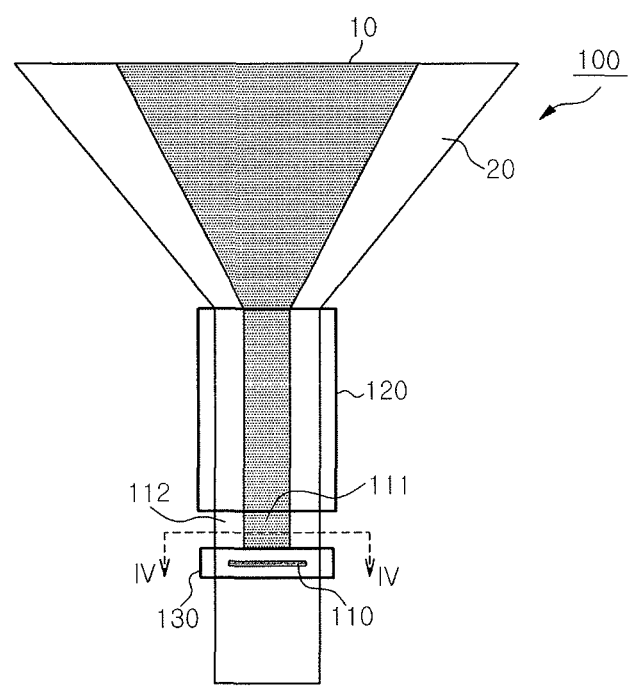
FIG. 3 is a view schematically showing an optical system of the illumination device according to the embodiment.

Next, description will be made on the configuration of the illumination device 100. FIG. 2 is a view conceptually showing the configuration of the illumination device 100 according to the first embodiment. FIG. 3 is a view schematically showing an optical system of the illumination device 100 according to the first embodiment.

As shown in FIGS. 2 and 3, the illumination device 100 includes an image element 110, a projection lens 120 and a substrate 130. The optical system of the illumination device 100 shown in FIG. 3 is a simplified optical system and is different in configuration from the detailed optical system to be described later.

The image element 110 is a substantially planar element that converts incident light to image light and outputs the image light (that generates light for image). In the first embodiment, the image element 110 is a transmission type liquid crystal panel. The image element 110 is provided in the central portion of the substrate 130 which is made of a light transmitting material. The projection lens 120 is a lens for projecting light onto an object. The projection lens 120 is a lens that has been conventionally used to focus the image light 10 on an object.

In the illumination device 100, there are provided a first light path 111 passing through the image element 110 and extending toward the projection lens 120 and a second light path 112 extending toward the projection lens 120 without passing through the image element 110. That is to say, the illumination device 100 includes an optical system that constitutes the first light path 111 and the second light path 112. The first light path 111 is a light path through which the light emitted as the image light 10 passes. The second light path 112 is a light path through which the light emitted as the illumination light 20 passes.

In this regard, the first light path 111 and the second light path 112 are two split light paths and the directions of the split light paths are substantially identical with each other.

More specifically, the first light path 111 and the second light path 112 are two light paths spatially split in a plane (split-emission plane) that intersects the light advancing direction. The first light path 111 and the second light path 112 are light paths (cross-sectionally split light paths) that are directed toward the substantially identical direction near the split-emission plane. In other words, in the vicinity of the split-emission plane, the advancing direction of the light passing through the first light path 111 and the advancing direction of the light passing through the second light path 112 are substantially identical with each other. In this regard, the term "substantially identical" means that the advancing directions of the light are substantially identical with each other in view of the deviation in the arrangement of parts of the optical system, the tolerance in the dimension of the respective parts, and the like.

The light passing through the first light path 111 transmits through the image element 110 to be incident on the projection lens 120. Thus, the image light 10 is projected onto a first region of an object. On the other hand, the light passing through the second light path 112 is incident on the projection lens 120 without transmitting through the image element 110. Thus, the illumination light 20 is projected onto a second region of the object. The first region of the object onto which the image light 10 is projected does not essentially overlap with the second region of the object onto which the illumination light 20 is projected. In the object, the second region is essentially positioned around the first region.

Figure 4:
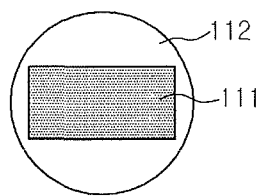
FIG. 4 is a sectional view of light paths taken along line IV-IV in FIG. 3.

When seen in an optical axis direction (in an advancing direction of light), the second light path 112 is provided to surround at least a portion of the first light path 111. FIG. 4 is a sectional view of the light paths taken along line IV-IV in FIG. 3 (a sectional view showing a cross section perpendicular to the optical axis). As shown in FIG. 4, when seen in the advancing direction of the light passing through the first light path 111, the first light path 111 is surrounded by the second light path 112 in at least a portion thereof along the advancing direction.

The light paths of the light moving toward a light splitting member 140 are not split. In other words, the first light path 111 of the light moving toward the light splitting member 140 is not shielded from, but is formed adjacent to (integrated with), the second light path 112 of the light moving toward the light splitting member 140.

In the first embodiment, the first light path 111 and the second light path 112 are two light paths split by the substrate 130 (hereinafter referred to as a light splitting member 140) provided with the image element 110.

Next, the light splitting member 140 which is a feature of the illumination device 100 will be described in detail with reference to FIG. 5.

Figure 5:
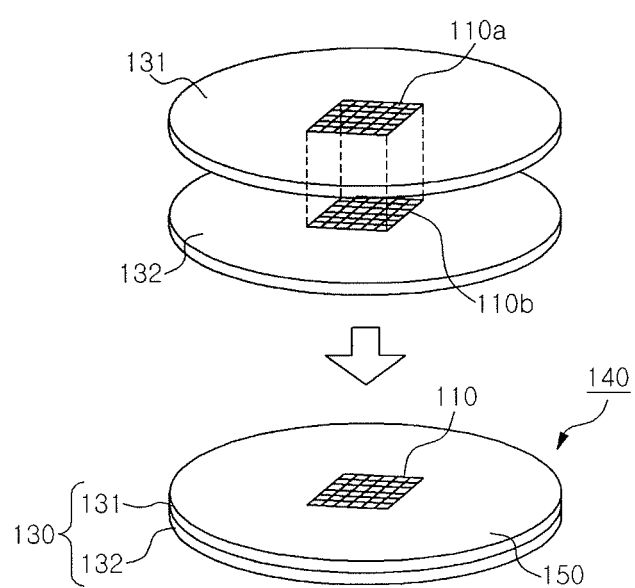
FIG. 5 is a view showing a configuration of the light splitting member according to the embodiment.

FIG. 5 is a view showing a configuration of the light splitting member 140 according to the first embodiment. The light splitting member 140 includes a first substrate 131, a second substrate 132, and the image element 110 (a first image element member 110*a* and a second image element member 110*b*).

The first substrate 131 and the second substrate 132 are circular glass substrates having a light transmitting property. The first image element member 110*a* is provided in a central portion of a major surface of the first substrate 131. Similarly, the second image element member 110*b* is provided in a central portion of a major surface of the second substrate 132.

The light splitting member 140 is formed by bonding the first substrate 131 and the second substrate 132 together. That is to say, the first image element member 110*a* and the second image element member 110*b* are overlapped with each other to form the image element 110.

The light transmitting through the region (image forming region) of the light splitting member 140 in which the image element 110 is provided, is converted to the light corresponding to the image of the image element 110 and is incident on the projection lens 120. That is to say, the light transmitting through the image element 110 (the image forming region) passes through the first light path 111. In other words, the image region (the image element 110) of the light splitting member 140 is included in the optical system that constitutes the first light path 111.

On the other hand, the region (light transmitting region) of the light splitting member 140 in which the image element 110 is not provided, is formed of light transmitting glass as mentioned above. Thus, the light transmitting through the light transmitting region is incident on the projection lens 120. That is to say, the light transmitting through the light transmitting region passes through the second light path 112. In other words, the light transmitting region of the light splitting member 140 is included in the optical system that constitutes the second light path 112. The advancing direction of the light coming out from the light splitting member 140 and passing through the first light path 111 and the advancing direction of the light coming out from the light splitting member 140 and passing through the second light path 112 are substantially identical with each other.

In the illumination device 100, the first light path 111 and the second light path 112 are formed by the light splitting member 140. Thus, for example, the illumination device 100 can project the image light 10 on a surface (irradiation surface) of a structure and can illuminate the surrounding of the image light 10 with the illumination light 20.

Figure 6A:
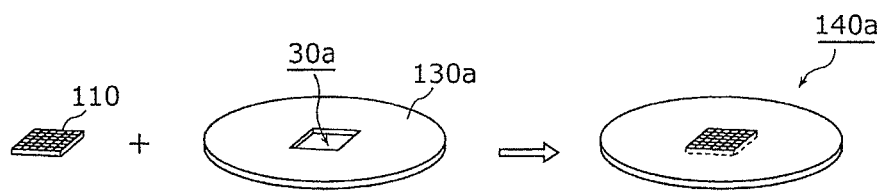
FIGS. 6A and 6B are first diagrams illustrating other configuration examples of the light splitting member.
Figure 6B:
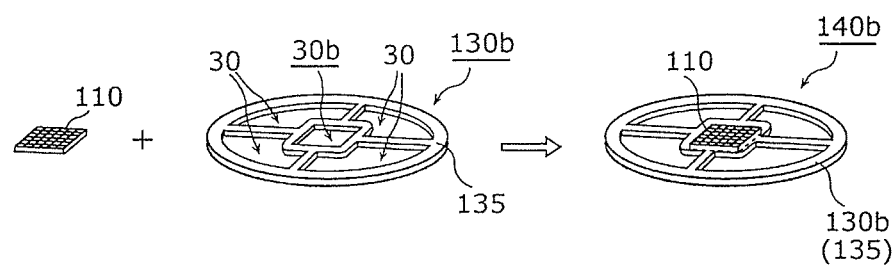

The configuration of the light splitting member 140 is not limited to the configuration shown in FIG. 5. FIGS. 6A and 6B are views illustrating other configuration examples of the light splitting member.

A light splitting member 140*a* shown in FIG. 6A is formed by inserting an image element 110 into an opening (or hole) 30*a* defined at the center of a disc-shaped light transmitting member 130*a*. The light transmitting member 130*a* may be made of any material such as a resin or the like as long as the material has a light transmitting property.

A light splitting member 140*b* shown in FIG. 6B has a configuration in which an image element 110 is held by a frame-shaped holding member 130*b* instead of a substrate. More specifically, the holding member 130*b* holds the image element 110 using an opening (holding portion) 30*b* corresponding in shape to the image element 110.

The holding member 130*b* is a frame-shaped member made of a light transmitting material. In addition to the opening 30*b*, four additional openings 30 are formed inside a circular main frame 135 that defines the contour of the holding member 130*b*. In case of the holding member 130*b*, a light transmitting region is defined by the holding member 130*b* and the openings 30.

While examples of the light splitting member have been described above, the shape (external form) of the light splitting member and the arrangement of the image element 110 within the light splitting member are not limited to the aforementioned configurations. The light splitting member may have any configuration as long as the light splitting member includes an image forming region in which the image element 110 is provided and a light transmitting region.

Figure 7A:
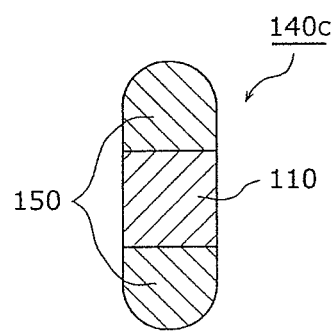
FIGS. 7A and 7B are second diagrams illustrating other configuration examples of the light splitting member.

The shape (plan-view contour) of the light splitting member may be, e.g., a race track shape. FIG. 7A is a schematic diagram showing a light splitting member 140*c* having a race track shape. In the light splitting member 140*c*, an image element 110 is provided at the center of the light splitting member 140*c* in such a way that the image element 110 is interposed between two light transmitting regions 150.

Figure 7B:
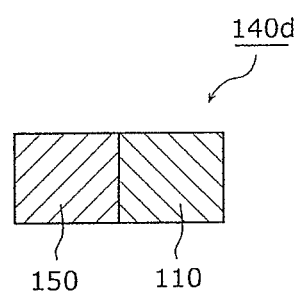

As shown in FIG. 7B, the shape of the light splitting member may be rectangular. FIG. 7B is a schematic diagram showing a rectangular light splitting member 140*d*. The light splitting member 140*d* is split into two rectangular regions, one of which is an image forming region where the image element 110 is provided and the other of which is a light transmitting region 150.

Figure 8:
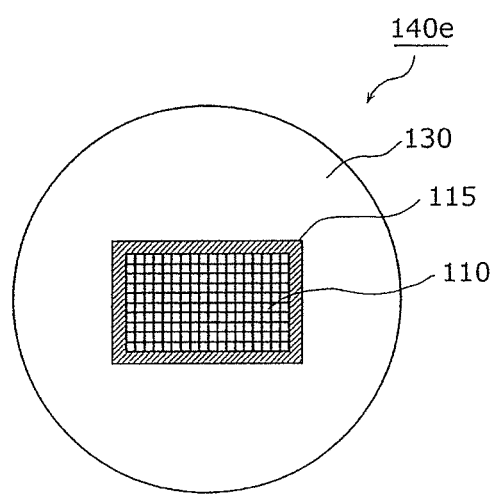
FIG. 8 is a plan view showing a light splitting member provided with a light shielding member.

A light shielding member may be provided in a border between the image forming region and the light transmitting region. FIG. 8 is a plan view illustrating a light splitting member 140*e* provided with a light shielding member 115. The light splitting member 140*e* shown in FIG. 8 has the same configuration as the light splitting member 140 except that the light splitting member 140*e* is provided with the light shielding member 115.

As shown in FIG. 8, when seen in a plan view, a mask (light shielding member) 115 that does not transmit light is provided in a border between the image element 110 (the image forming region) and the substrate 130 (the light transmitting region) of the light splitting member 140e. That is to say, the first light path 111 and the second light path 112 are isolated by the mask 115. In other words, the first light path 111 and the second light path 112 are isolated by the mask 115 in a portion along the light paths. The mask 115 is one example of the light shielding member. The light shielding member may be other members.

Next, description will be made on an optical system of the illumination device 100. The illumination device 100 is realized by, e.g., a single-plate-type illumination device 100.

Figure 9:
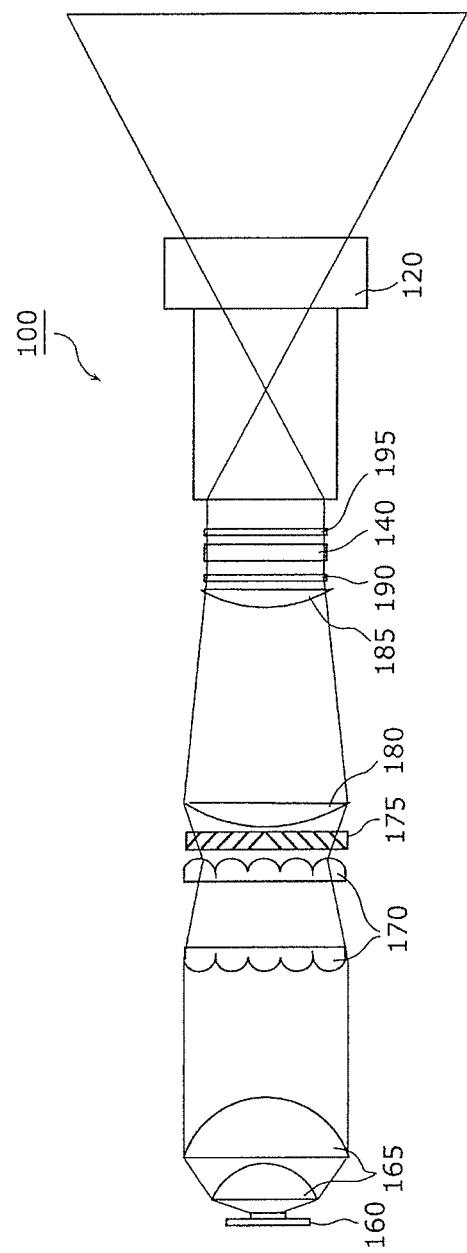
FIG. 9 is a view showing an optical system of a single-plate-type illumination device according to the embodiment.

FIG. 9 is a view showing an optical system of the single-plate-type illumination device 100. As shown in FIG. 9, the illumination device 100 includes a white light source 160, a collimator lens 165, an integrator lens 170, a polarizing beam splitter 175, a condensing lens 180 and a collimator lens 185. The illumination device 100 further includes an incidence-side polarizing element 190, a light splitting member 140, an emission-side polarizing element 195 and a projection lens 120.

The white light source 160 is a light source that generates white light. Specifically, the white light source 160 is a light source that makes use of a discharge lamp or a solid light emitting element such as a light emitting diode (LED), a semiconductor laser, an organic EL (Electroluminescence) element, an inorganic EL element or the like.

The light generated by the white light source 160 is made parallel in the collimator lens 165. The illuminance distribution of the light is made uniform by the integrator lens 170. Then, the light whose illuminance distribution is made uniform is converted to linearly polarized light by the polarizing beam splitter 175. It is assumed that the light whose illuminance distribution is made uniform is converted to, e.g., P-polarized light.

The P-polarized light is incident on the condensing lens 180 and is made parallel by the collimator lens 185. Then, the light is incident on the incidence-side polarizing element 190.

The incidence-side polarizing element 190 is a substrate provided with a polarizing plate (polarization control element) that polarizes the light incident toward the image element 110. The emission-side polarizing element 195 is a substrate provided with a polarizing plate that polarizes the light emitted from the image element 110.

In this regard, the incidence-side polarizing element 190 and the emission-side polarizing element 195 have a structure corresponding to the light splitting member 140. More specifically, the incidence-side polarizing element 190 (or the emission-side polarizing element 195) is configured such that a polarizing plate is provided only in the portion corresponding to the image forming region of the light splitting member 140 (i.e., the portion overlapping with (corresponding to) the image forming region of the light splitting member 140 when seen in a direction perpendicular to an optical axis), with the remaining portion configured to transmit light. That is to say, the incidence-side polarizing element 190 (or the emission-side polarizing element 195) includes a polarization control region where the polarizing plate is provided and a light transmitting region around the polarization control region.

Since the polarization control region is configured to transmit P-polarized light, the light incident on the polarization control region of the incidence-side polarizing element 190 is incident on the image element 110 and is emitted from the image element 110 after being optically modulated pursuant to the image of the image element 110.

Unlike the polarization control region of the incidence-side polarizing element 190, the polarization control region of the emission-side polarizing element 195 is configured to transmit only S-polarized light. Thus, only an S-polarized light component of the optically modulated light is incident on the projection lens 120 after passing through the polarization control region of the emission-side polarizing element 195. As a result, the image light 10 is projected on a screen or the like through the projection lens 120.

On the other hand, the light incident on the light transmitting region of the incidence-side polarizing element 190 passes through (transmits) the light transmitting region of the light splitting member 140 and the light transmitting region of the emission-side polarizing element 195 sequentially. Then, the light is incident on the projection lens 120. As a result, the illumination light 20 is projected on a screen or the like through the projection lens 120.

As described above, the illumination device 100, which is a single-plate-type illumination device, can simultaneously project the image light 10 and the illumination light 20.

Figure 10:
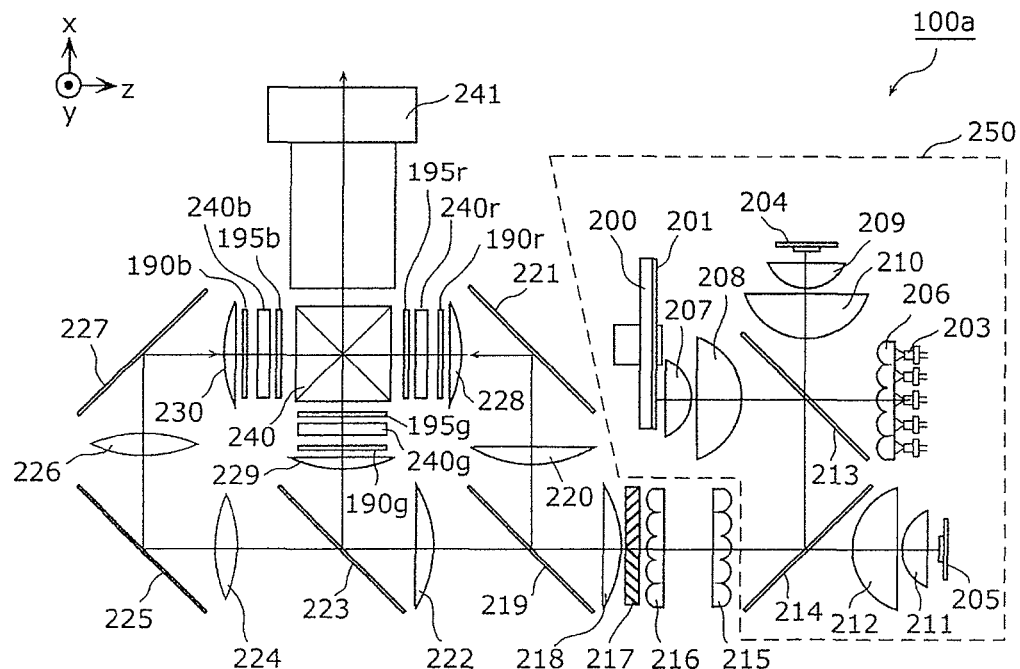
FIG. 10 is a view showing an optical system of a three-plate-type illumination device according to the embodiment.

The present invention may be realized by a three-plate-type illumination device. FIG. 10 is a view showing an optical system of a three-plate-type illumination device 100a according to the first embodiment. In the following description, components substantially identical with those shown in FIG. 9 will not be described.

The illumination device 100a includes a phosphor wheel 200, an excitation light source 203, a red light source 204, a blue light source 205, a collimator lens array 206, and condensing lenses 207, 208 and 218. The illumination device 100a further includes collimator lenses 209, 210, 211 and 212, dichroic mirrors 213, 214, 219 and 223, and integrator lens arrays 215 and 216. The illumination device 100a further includes a polarizing beam splitter 217, reflection mirrors 221, 225 and 227, relay lenses 220, 222, 224 and 226, and field lenses 228, 229 and 230.

The illumination device 100a further includes incidence-side polarizing elements 190b, 190g and 190r, light splitting members 240b, 240g and 240r, emission-side polarizing elements 195b, 195g and 195r, a cross dichroic prism 240, and a projection lens 241.

The incidence-side polarizing elements 190b, 190g and 190r are substantially identical in configuration with the incidence-side polarizing element 190 described above. The emission-side polarizing elements 195b, 195g and 195r are substantially identical in configuration with the emission-side polarizing element 195 described above. The light splitting members 240b, 240g and 240r are substantially identical in configuration with the light splitting member 140 except that they are provided with image elements 110 corresponding to blue, green and red colors, respectively.

First, description will be made on a light source unit 250 shown in FIG. 10.

The phosphor wheel 200 is provided with a glass substrate. A dichroic coat that efficiently reflects visible light is formed on the surface of the glass substrate. A phosphor 201 that generates green light is coated on the dichroic coat in the shape of a thin film. The method of forming the thin film of the phosphor 201 is not particularly limited and may be a precipitation method or a printing method. In case where x, y and z coordinate axes are set as shown in FIG. 10, the phosphor wheel 200 rotates about the z axis.

The excitation light source 203 is a blue semiconductor laser that oscillates at or around a wavelength of about 445 nm. The excitation light source 203 is configured by a plurality of laser diodes. In FIG. 10, twenty five laser diodes are arranged in a 5×5 matrix pattern. The number of the laser diodes is not particularly limited and may be properly set depending on the intensity of light to be extracted.

The laser light generated from the excitation light source 203 is collimated by the collimator lens array 206. The laser diodes that constitute the excitation light source 203 are arranged in one-to-one correspondence to the respective lens cells of the collimator lens array 206.

The collimated laser light passes through a dichroic mirror 213. Thereafter, the laser light is collected on the phosphor 201 by the condensing lenses 207 and 208. As a result, green light is generated from the phosphor 201.

In this regard, the dichroic mirror 213 transmits the laser light generated from the excitation light source 203 and the red light generated from the red light source 204. The dichroic mirror 213 reflects the green light generated from the phosphor 201.

Meanwhile, a dichroic mirror 214 reflects the green light generated from the phosphor 201 and the red light generated from the red light source 204. The dichroic mirror 214 transmits the blue light generated from the blue light source 205.

Accordingly, the green light generated from the phosphor 201 is reflected by the dichroic mirrors 213 and 214 and is emitted from the light source unit 250.

The red light source 204 is an LED having a dominant wavelength of 623 nm. The red light generated from the red light source 204 is collimated by the collimator lenses 209 and 210. The collimated red light passes through the dichroic mirror 213. The red light is reflected by the dichroic mirror 214 and is emitted from the light source unit 250.

The blue light source 205 is an LED having a dominant wavelength of 462 nm. The blue light generated from the blue light source 205 is collimated by the collimator lenses 211 and 212. The collimated blue light passes through the dichroic mirror 214. Then, the blue light is emitted from the light source unit 250.

Next, description will be made on an optical system other than the light source unit 250.

The illuminance distribution of each of the green light, the red light and the blue light emitted from the light source unit 250 is made uniform by the integrator lens arrays 215 and 216. Each of the green light, the red light and the blue light is converted to linearly polarized light by the polarizing beam splitter 217 and is incident on the condensing lens 218.

In this regard, the dichroic mirror 219 has a property of reflecting the red light and transmitting the green light and the blue light. Accordingly, the red light is reflected by the dichroic mirror 219 and is incident on the field lens 228 via the relay lens 220 and the reflection mirror 221.

The red light incident on the field lens 228 is split by the incidence-side polarizing element 190r, the light splitting member 240r and the emission-side polarizing element 195r. The split red light is moved through the cross dichroic prism 240 and is separated into a red component of the image light 10 and a red component of the illumination light 20, which are projected through the projection lens 241.

The dichroic mirror 223 has a property of reflecting the green light and transmitting the blue light. Accordingly, the green light passes through the dichroic mirror 219 and then the relay lens 222. Then, the green light is reflected by the dichroic mirror 223 and is incident on the field lens 229.

The green light incident on the field lens 229 is split by the incidence-side polarizing element 190g, the light splitting member 240g and the emission-side polarizing element 195g. The split green light is moved through the cross dichroic prism 240 and is separated into a green component of the image light 10 and a green component of the illumination light 20, which are projected through the projection lens 241.

The blue light passes through the dichroic mirror 219, the relay lens 222 and the dichroic mirror 223 in the named order. Then, the blue light is moved through the relay lens 224, the reflection mirror 225, the relay lens 226 and the reflection mirror 227 in that order and is incident on the field lens 230.

The blue light incident on the field lens 230 is split by the incidence-side polarizing element 190b, the light splitting member 240b and the emission-side polarizing element 195b. The split blue light is moved through the cross dichroic prism 240 and is separated into a blue component of the image light 10 and a blue component of the illumination light 20, which are projected through the projection lens 241.

As described above, the illumination device 100a, which is a three-plate-type illumination device, can simultaneously project the image light 10 and the illumination light 20.

Described above are the illumination device 100 and the illumination device 100a according to the first embodiment. In the illumination device 100 and the illumination device 100a, there are provided the first light path 111 which extends toward the projection lens 120 via the image element 110 and the second light path 112 which extends toward the projection lens 120 without passing through the image element 110. The first light path 111 and the second light path 112 are two split light paths which extend in the substantially identical direction.

With this configuration, the illumination device 100 and the illumination device 100a can simultaneously project the image light 10 and the illumination light 20.

Second Embodiment

In the first embodiment, description has been made on the illumination device 100 (the illumination device 100a) that makes use of the transmission-type image element 110. However, the present invention may be realized using a reflection-type image element.

Figure 11:
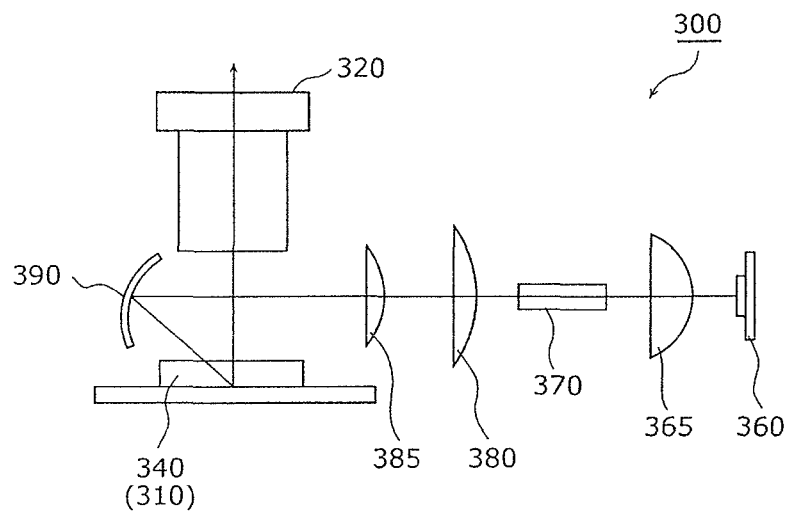
FIG. 11 is a view showing an optical system of an illumination device using a reflection-type image element according to another embodiment.

In the second embodiment, description will be made on an illumination device which makes use of a reflection-type image element. FIG. 11 is a view showing an optical system of an illumination device using a reflection-type image element according to the second embodiment.

As shown in FIG. 11, the illumination device 300 according to the second embodiment includes a white light source 360, a light splitting member 340 provided with a reflection-type image element 310, a condensing lens 365, a rod integrator 370, a relay lens 380, and a field lens 385.

First, description will be made on the light splitting member 340 according to the second embodiment.

The light splitting member 340 according to the second embodiment makes use of, e.g., a disc-shaped mirror member (light reflecting member) in place of the disc-shaped light transmitting member 130a employed in the light splitting member 140a shown in FIG. 6A. The light splitting member 340 is formed by inserting a reflection-type image element 310, instead of the image element 110, into an opening defined at the center of the mirror member.

The mirror member may be formed of any material as long as the material can reflect light. The light splitting member using the reflection-type image element 310 may have a configuration in which the image element 310 is provided in a substrate capable of reflecting light.

In the second embodiment, a micro mirror array is used as the reflection-type image element 310. The micro mirror array is an element in which micro mirrors are arranged in a matrix pattern. The respective micro mirrors correspond to pixels of an image. The slope of each of the micro mirrors is changed pursuant to an image signal. The amount of the light incident on the projection lens 120 (the brightness and darkness of an image) is changed depending on the slopes of the micro mirrors. Thus, the image light 10 is projected through the projection lens.

Instead of the micro mirror array, a reflection-type liquid crystal panel (LCOS: Liquid Crystal on Silicon) may be used as the reflection-type image element.

Thus, the light splitting member 340 includes an image forming region where the image element 310 is provided and a light reflecting region (a region of the mirror member other than the image forming region).

In the second embodiment, the first light path 111 and the second light path 112 are two light paths split by the light splitting member 340 (an element which includes a plane having an image forming region and a light reflecting region). More specifically, the first light path 111 is a light path of the light reflected in the image forming region and incident on the projection lens 120. The second light path 112 is a light path of the light reflected in the light reflecting region and incident on the projection lens 120.

Next, description will be made on an optical system shown in FIG. 11.

The light generated from the white light source 360 is collected onto the rod integrator 370 by the condensing lens 365. The light whose illuminance is made uniform is emitted from the rod integrator 370.

Then, the light emitted from the rod integrator 370 passes through the relay lens 380 and the filed lens 385. The light is reflected by the reflection mirror 390 and is incident on the light splitting member 340 provided with the reflection-type image element 310.

As mentioned above, the light incident on the image forming region of the light splitting member 340 is converted to the image light depending on the slopes of the micro mirrors and is incident on the projection lens 320. As a result, the image light 10 is projected on a screen or the like through the projection lens 320.

On the other hand, the light incident on the light reflecting region of the image element 310 is reflected by the light reflecting region and is incident on the projection lens 320. As a result, the illumination light 20 is projected on a screen or the like through the projection lens 320.

Described above is the illumination device 300 according to the second embodiment. In the illumination device 300, there are provided the first light path 111 which extends toward the projection lens 320 via the reflection-type image element 310 and the second light path 112 which extends toward the projection lens 320 without passing through the reflection-type image element 310. The first light path 111 and the second light path 112 are two light paths split on the plane which intersects the optical axis (the plane which includes the image element 310).

With this configuration, the illumination device 300 can simultaneously project the image light 10 and the illumination light 20.

The present invention may be realized by a three-plate-type illumination device that makes use of the reflection-type image element 310. No description will be made on an optical system available in this case.

Other Embodiments

While the illumination devices according to the first and second embodiments have been described above, the present invention is not limited to these embodiments.

In the aforementioned embodiments, description has been made on an example in which the light emitted from one light source is split to pass through the first light path 111 and the second light path 112. Alternatively, a light source for generating the light that passes through the first light path 111 and a light source for generating the light that passes through the second light path 112 may be provided independently of each other.

If the first light path 111 passing through the image element and the second light path 112 not passing through the image element are provided in the illumination device, it is possible for the illumination device to project the image light 10 and the illumination light 20. Therefore, the first light path 111 and the second light path 112 may be light paths split by a method other than the methods described in the aforementioned embodiments.

Figure 12:
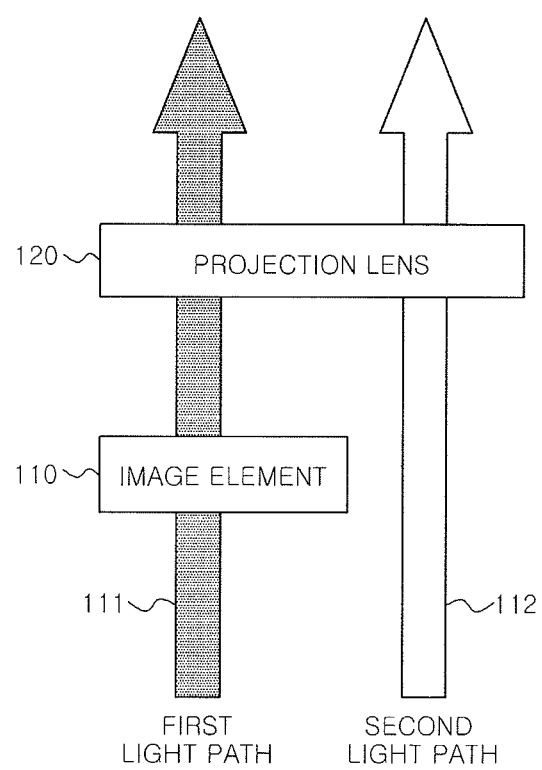
FIG. 12 is a first diagram conceptually illustrating an illumination device in which a first light path and a second light path are provided by another method.

For example, as shown in a conceptual diagram of FIG. 12, the first light path 111 and the second light path 112 are directionally split light paths. The second light path 112 may be a light path which does not pass through the vicinity of the image element 110. More specifically, the first light path 111 and the second light path 112 may be light paths which are split by a half mirror or the like, at a location where the light is not yet incident on the image element, so as to extend in different directions.

Figure 13:
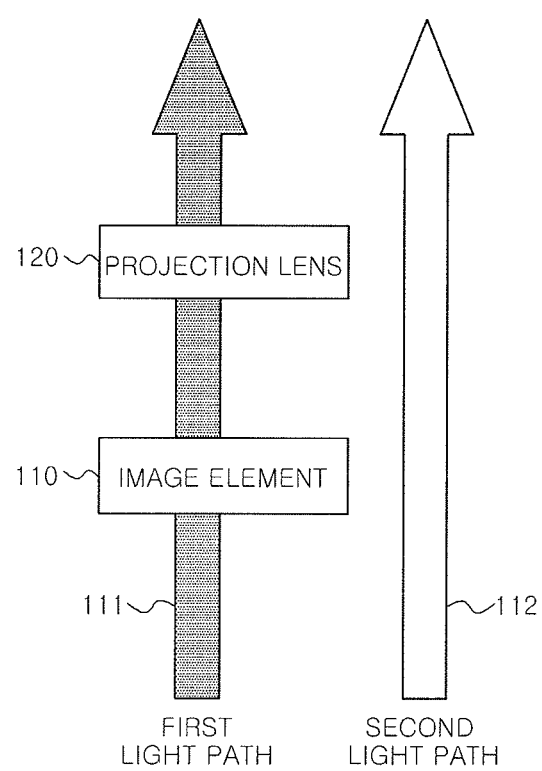
FIG. 13 is a second diagram conceptually illustrating an illumination device in which a first light path and a second light path are provided by a further method.

For example, as shown in a conceptual diagram of FIG. 13, the second light path 112 may be a light path that does not pass through both the image element 110 and the projection lens 120.

Figure 14:
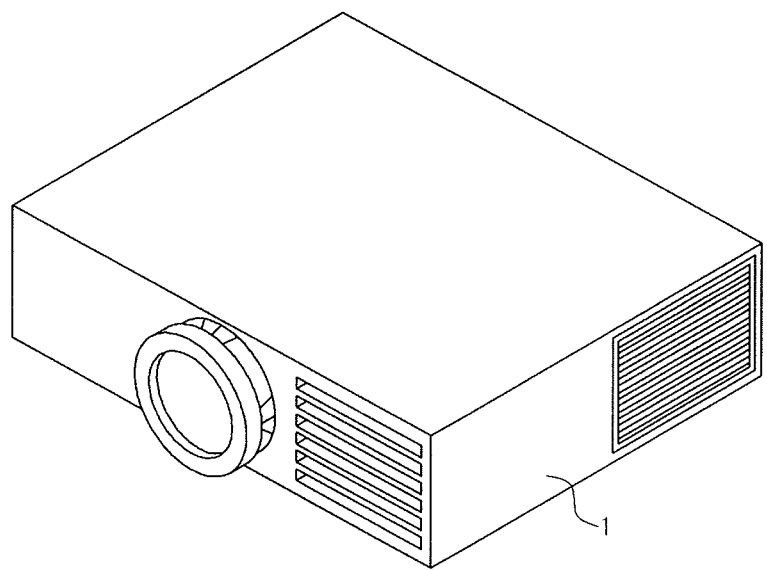
FIG. 14 is a view showing an application example of the illumination device.

The illumination devices according to the aforementioned embodiments can be realized into, e.g., a projector 1 shown in FIG. 14.

The present invention may be realized not only into the illumination device but also into the light splitting member or the polarizing element (the incidence-side polarizing element and the emission-side polarizing element) described in the aforementioned embodiments.

While the illumination device according to one or more embodiments have been described above, the present invention is not limited to these embodiments.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination device, comprising:
   an image element configured to convert light incident thereon to image light and to output the image light;
   a first light path that passes through the image element;
   a second light path that does not pass through the image element; and
   a single light source configured to generate light passing along the first light path and along the second light path,
   wherein the first light path and the second light path are configured to project light passing therealong, respectively, on an object located outside the illumination device,
   the image element comprises a substantially planar element, and the first light path and the second light path respectively extend through two separate regions on a plane including the image element, and the first light path and the second light path are two split light paths, extending directions of the first and second light paths are substantially identical with each other, the illumination device further comprises a light shielding member configured to isolate at least a portion of the first light path from the second light path, wherein the light shielding member surrounds a peripheral portion of the image element, and the light shielding member is provided between the first light path and the second light path and does not transmit light.

2. The illumination device of claim 1, further comprising:
a projection lens configured to project the light passing along the first light path and the second light path, respectively, on the object, wherein the first light path includes a light path extending toward the projection lens via the image element, and the second light path includes a light path extending toward the projection lens without passing through the image element.

3. The illumination device of claim 2, wherein, when viewed in the extending direction of the first light path, the first light path is surrounded by the second light path in at least a portion thereof along the extending direction.

4. The illumination device of claim 2, wherein at least a portion of the first light path is provided adjacent to the second light path without being isolated from the second light path.

5. The illumination device of claim 2, wherein the image element includes a light-transmission-type image element configured to convert the light transmitting therethrough to the image light.

6. The illumination device of claim 5, wherein the first light path and the second light path are two light paths split on a plane including the two separate regions, one of the regions is an image forming region where the image element is provided and the other of the regions is a light transmitting region, the first light path is for light passing through the image forming region to be incident on the projection lens, and the second light path is for light passing through the light transmitting region to be incident on the projection lens.

7. The illumination device of claim 6, further comprising:
a planar substrate including a light transmitting member, and wherein the image element extends into an opening defined at a center of the light transmitting member, and wherein the image forming region and the light transmitting region are provided in the planar substrate.

8. The illumination device of claim 6, further comprising a frame-shaped holding member, wherein the frame-shaped holding member holds the image element by using an opening defined at a center of the frame-shaped holding member, wherein additional openings are provided inside of the frame-shaped holding member and the light transmitting region is defined by the frame-shaped holding member and the additional openings.

9. The illumination device of claim 5, wherein the image element includes a transmission-type liquid crystal panel.

10. The illumination device of claim 9, further comprising:
a polarizing element that includes a light transmitting region and a polarization control region where a polarization control element for polarizing light moving toward the image element or light emitted from the image element is provided.

11. The illumination device of claim 10, wherein the polarizing element further includes a substrate in which the polarization control region and the light transmitting region are provided.

12. The illumination device of claim 2, wherein the image element includes a light-reflection-type image element configured to reflect the light incident on the image element as the image light.

13. The illumination device of claim 12, wherein the first light path and the second light path are two light paths split on a plane including the two separate regions, one of the regions is an image forming region where the image element is provided and the other of the regions is a light reflecting region, the first light path is for light that is reflected in the image forming region to be incident on the projection lens, and the second light path is for light that is reflected in the light reflecting region to be incident on the projection lens.

14. The illumination device of claim 13, further comprising:
a substrate, and wherein the image forming region and the light reflecting region are provided in the substrate.

15. The illumination device of claim 13, wherein the image element includes a reflection-type liquid crystal panel.

16. The illumination device of claim 12, wherein the image element includes a micro mirror array.

17. The illumination device according to claim 1, the light shielding member comprising a mask.

18. The illumination device according to claim 1, the light shielding member comprising a planar member.

19. The illumination device according to claim 18, the light shielding member being provided in a plane that is substantially parallel to the plane including the image element.

* * * * *